Feb. 23, 1943.  C. J. STOETE  2,311,909
LIGHT ADVERTISING DEVICE
Filed Aug. 3, 1939
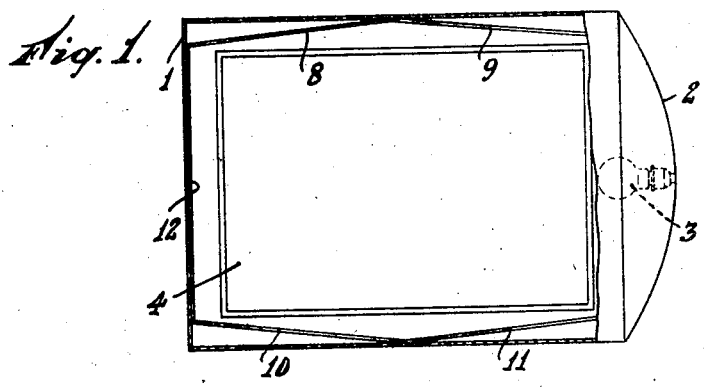
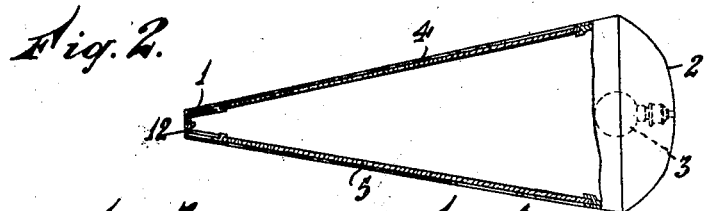
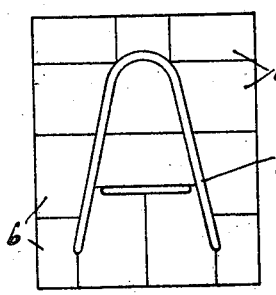
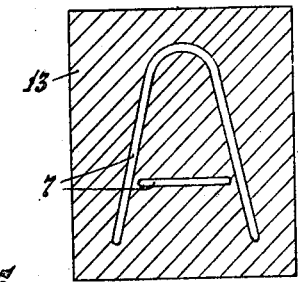
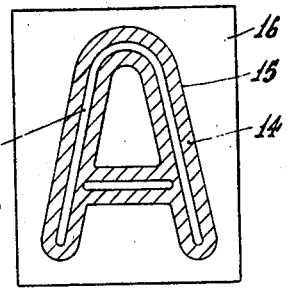
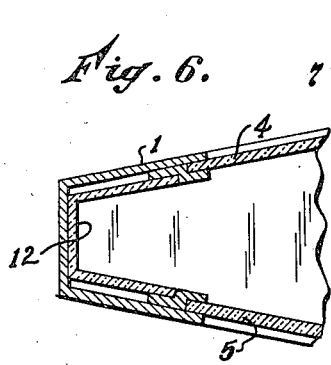
Inventor,
C. J. Stoete
By: Glascock Downing & Seebold
Attys.

Patented Feb. 23, 1943

2,311,909

UNITED STATES PATENT OFFICE 2,311,909

LIGHT ADVERTISING DEVICE

Cornelis Jacobus Stoete, Haarlem, Netherlands; vested in the Alien Property Custodian Application August 3, 1939, Serial No. 288,226
In the Netherlands August 20, 1938

2 Claims. (Cl. 40—132)

The invention relates to a light advertising device comprising a light casing, in which one or a plurality of sources of light are provided, the light of which falls upon one or a plurality of transparencies arranged in the casing and illuminating the advertisements or the like to be displayed.

The light advertising devices of said kind known heretofore have the drawback that, unless they are realized with neon tubes in the shape of the advertisements or the like to be displayed, they draw too little attention, because the light impression is too weak. It has already been proposed to eliminate said drawback by increasing the intensity of the sources of light, but on the one side the generation of heat of the sources of light in the light casing becomes too great and on the other side the consumption of electric energy becomes too high. Further the inner side of the light casing has always been painted with a light reflecting layer, but also in this case a very weak radiation of light is obtained compared with neon tubes.

The invention has for its object to provide a light advertising device capable of displaying letters, signs and images with a light intensity approaching and even surpassing the radiation of neon tubes.

According to the invention this result is obtained by covering the entire inner side of the light casing with reflecting surfaces which, with respect to the source or sources of light are arranged in such a manner, that the maximum available quantity of light is reflected as completely as possible and exclusively to the advertisements or the like to be displayed. According to the invention the reflecting surfaces preferably comprise glass or metallic mosaic mirrors, which are shaped and arranged in such a manner, that after their fixation to e. g. a glass sheet constituting a wall of the light casing, they leave open parts the shape and size of which correspond to the advertisements or the like to be displayed.

A source of light is mounted in the light casing, the light of which is reflected by means of reflectors and directly to the reflecting surfaces, so that by repeated reflection a pencil of light of large intensity may leave the open parts. Said open parts may pass coloured light, if desired, e. g. by filling them up with coloured strips of glass, or Celluloid or they may be coloured in another way. The outer side of the light casing may be painted with the advertisements or the like to be displayed arranged around the corresponding openings, so that a text is obtained, which is also clearly visible at day time. Instead of reflecting mosaic glass also reflecting glasses as a whole may be used. The open parts may then be obtained by removing certain portions of the silvering.

According to the invention it is also possible to fill up the open parts, if the same are provided in a metallic sheet instead of in a glass sheet, with small tubes in the shape of the advertisements or the like, which tubes are partially let into said open parts at a certain depth. The effect obtained with such a light casing corresponds to a still greater extent to that of neon tubes.

The invention will now be described with reference to the accompanying drawing which shows some embodiments.

Figure 1 is a cross section of an embodiment of a light casing according to the invention.

Figure 2 is a cross section of the same light casing in a plane perpendicular to the first cross section.

Figure 3 is a back view of an advertising letter.

Figures 4 and 5 are front views of two embodiments of advertising letters.

Fig. 6 is an enlarged sectional detail of the arrangement shown at the left side of Fig. 2.

The light casing according to Figures 1 and 2 comprises e. g. a V-shaped ending metallic or wooden frame 1, the open side of which is closed by a reflector 2, which may consist of some parts making an obtuse angle with each other. A source of light 3, e. g. a glow lamp, which in a normal light casing for shop advertisements need not be larger than 150 watts, is located in the focus of said reflector. Both side walls of the light casing consist of e. g. glass sheets 4 and 5, the inner side of which is covered with pieces of mirror 6, which are shaped and arranged in such a manner, that the sign to be displayed is left open (Fig. 3). In the upper and lower side of the casing are located two mirrors 8, 9 respectively 10, 11 at such an obtuse angle that the light of the lamp 3 is distributed as favourably as possible. A mirror 12 is also located in the point of the V-shaped casing. It now appears, that when illuminating the interior of the casing by the lamp 3 a very favourable distribution of light and a high light efficiency is obtained, which is shown by a concentrated pencil of light leaving the signs (A, Fig. 3). The mirrors 8, 11 may also be arranged in another manner, viz. not at an obtuse angle with each other but parallel to each other and at an acute angle with respect to the length axis of the light diagram of the source of light 3.

The outer side of the light casing may have the appearance of a luminous letter (A, Fig. 4) on a dark (cross-hatched) background 13 or of a luminous letter 7 (A, Fig. 5) on a dark (cross-hatched) background 14 delimited by a clear line 15 with respect to a coloured background 16. In both cases a very manifesting, sharply defined letter is visible. The luminous letter may also be outlined by a layer of clear painting of a corresponding shape, which at day time has a favourable appearance and at night time gives an aureol effect around the letter, which is normally present with neon tubes.

If desired a sheet of ground glass may be placed before the sheets 4 and 5 so as to protect the layers of painting and other transparent portions against the weather.

I claim:

1. A light advertising device comprising a light casing including opposite side walls inclined toward one another, triangular shaped top and bottom walls, a narrow wall connecting the side walls at their closely spaced ends and a curved wall connecting the other ends of the side walls, mirrors on the inner surface of the side and end walls constituting reflecting surfaces with the exception of those portions on the side walls where the signs are to be displayed, a source of light located near the curved end wall and disposed centrally thereof and opposite the narrow end wall, and mirrors arranged near the top and bottom walls and positioned at obtuse angles relative to each other and extending over the entire area of the top and bottom walls.

2. A light advertising device as claimed in claim 1, in which the side walls are formed of translucent material, a mirroring arranged on the inner surface of the translucent side walls and composed of a plurality of pieces of mirror in the shape of mosaic sheets and which are of such a shape and arrangement that open parts are left in the shape of the signs to be displayed, and transparent strips covering the open parts.

CORNELIS JACOBUS STOETE.